July 7, 1964
G. O. SMITH
3,139,644
WINDSHIELD WIPER
Filed April 9, 1962
2 Sheets-Sheet 1
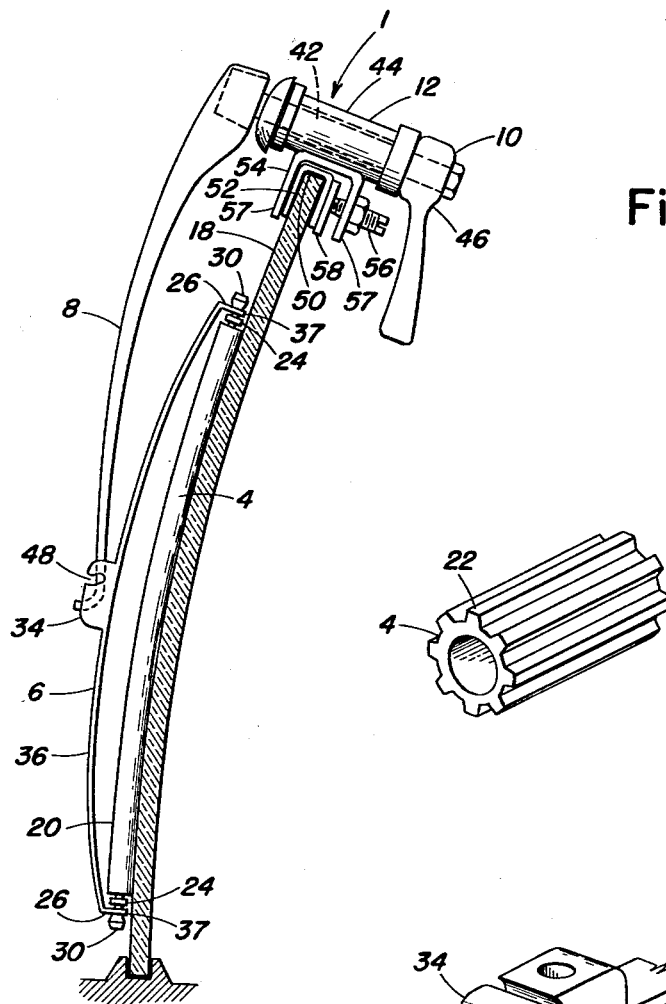
Fig. 1.
Fig. 3.
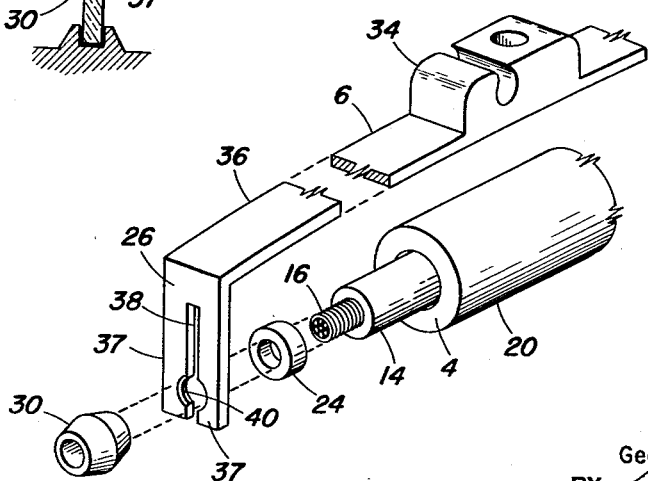
Fig. 2.
INVENTOR
George O. Smith
BY *Daniel J. Reardon*
ATTORNEY July 7, 1964  G. O. SMITH  3,139,644
WINDSHIELD WIPER Filed April 9, 1962  2 Sheets-Sheet 2

INVENTOR
George O. Smith
BY
ATTORNEY

United States Patent Office 3,139,644
Patented July 7, 1964

3,139,644
WINDSHIELD WIPER
George O. Smith, 110—21 73rd Road, Forest Hills, N.Y.
Filed Apr. 9, 1962, Ser. No. 186,236
6 Claims. (Cl. 15—250.30)

This invention relates to windshield wipers for vehicles. More particularly, the present invention relates to novel windshield wipers for use with a variety of vehicles but which are uniquely adapted for use with plastic windshields such as are employed in marine motor launches and the like.

Conventional windshield wipers employed heretofore have manifested certain well-known disadvantages; such as the smearing observed to occur under varying conditions of use; and the scratching which so frequently occurs when such wiper devices are used on surfaces other than safety glass. Indeed, their use with many plastic windshields such as are commonly employed in marine motor launches has been substantially obviated because of these qualities.

It is, accordingly, one object of this invention to provide a windshield wiper which is applicable to a variety of surfaces of varying degrees of sensitivity to physical pressure and deformation.

Another object of this invention is to provide a windshield wiper device which substantially eliminates streaking and smearing and thus enhances the visibility obtainable therethrough, particularly where a transparent plastic windshield is employed.

Another object of this invention is to secure flexibility, resiliency and an even distribution of pressure in the wiper member and to thus render it effective on curved and uneven surfaces.

Another object of this invention is the provision of a windshield wiper construction which while uniquely applicable to relatively sensitive windshield surfaces, is conveniently adaptable with a minimum of modification to employment, where desired, with conventional windshield wiper elements.

These and other significant objectives and advantages of the present invention will become evident in the course of the detailed description appearing hereinafter considered in concert with the accompanying drawings, showing illustrative embodiments of the invention.

The drawings are as follows:

FIGURE 1 is an elevational view of a windshield wiper device prepared in accordance with the practice of the invention.

FIGURE 2 is a fragmentary exploded elevational illustration of the wiper element and support member of the device of FIGURE 1.

FIGURE 3 is a fragmentary elevational view of a modified wiper element for use in the device of FIGURE 1.

Figure 4:
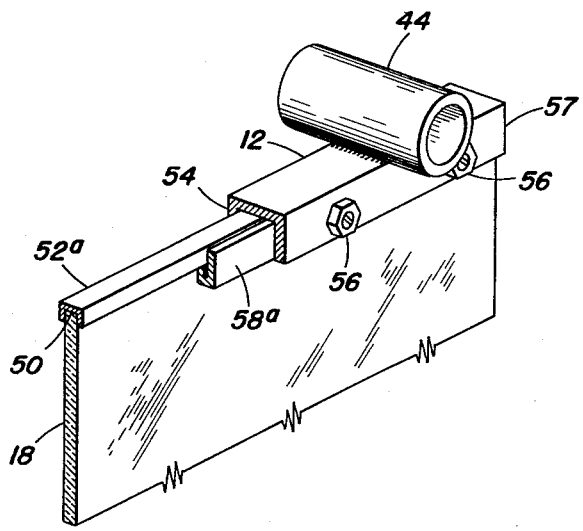
FIGURE 4 is a perspective view of a modified means of attachment to a windshield of the windshield wiper assembly of the invention.

Referring more particularly to the accompanying drawings in which like numbers in the written description and drawings designate like parts, the windshield wiper apparatus 1 of the invention as seen specifically in FIGURES 1 to 4 is composed principally of the cylindrical roller element 4, the arched spring retainer element 6, the oscillating wiper arm 8, the rotary control device 10 and the support casing and clamping means 12. The roller element 4 is formed of a resilient, flexible material such as live rubber or a like material. An orifice is disposed longitudinally through the length of this roller which is lined by a tubing 14 made of a smooth, less resilient material than that of the roller element per se, e.g., nylon, polyethylene, or the like. The latter tubing 14 serves to enclose and separate the roller 4 from a flexible shaft or cable 16 disposed along the interior of said lining 14 and emerging therefrom at both ends, and formed, illustratively, of four strands of reversely wound preferably non-corrosive metallic cable, e.g., speedometer cable made of bronze, copper, brass, stainless steel, or the like. The roller 4 and lining 14 rotate about their common axis as represented by the cable 16 due to the frictional contact of the relatively soft roller 4 with the transparent plastic, e.g., Plexiglas (a trade name); glass; or other standard windshield surface 18; and the reduced frictional contact between the relatively harder lining component 14 and cable 16. The frictional contact between the roller element 4 and liner 14 is such, however, that one is virtually secured to the other and they thus rotate in concert. An illustrative and preferred embodiment of the roller 4, is one formed of soft resilient, flexible rubber hose having an inside hose diameter of $3/16$ of an inch and an outside diameter of from $15/32$ inch to $5/8$ inch. The inside diameter of the liner 14 is, in this instance, about $1/8$ inch, or more desirably .005 inch in excess thereof, to permit free rotation about the cable 16 of $1/8$ inch diameter. The wiper element 4 and lining thereof 14 are normally from ten to sixteen inches in length in this illustrative embodiment. The roller 4 may have a smooth surface 20 or a fluted surface 22, the latter being illustrated in FIGURE 3, and effecting a squeegee action on the surface 18 to be wiped. The flutes are desirably $1/16$ inch in height, illustratively. If the roller 4 is fluted, a desired outer diameter is $5/8$ inch with a bottom outside diameter of 0.5 inch or less.

Small cylindrical metallic washers 24 again preferably formed of a non-corrosive metal such as brass, are positioned at opposite ends of the roller 4 and lining 14 and about the cable 16. These elements 24 assist in providing for the free rotation of the cyindrical roller 4 by separating the roller 4 from the attachment means 26 of the spring bow 6 described hereinafter. The brass washers 24 in an illustrative embodiment of the invention having the dimensions recited above, are about $1/8$ inch in width and inside diameter; the latter to accommodate the cable 16. The outside diameter is then about $5/16$ inch.

On each end of the cable 16 which has been cut to a predetermined shorter length than the arched bow member 6 are metallic grommets 30, desirably brass in composition, adapted to fit over the speedometer cable ends and snubbed, swedged or screwed into position thereon in such a manner as to maintain the cable 16 under tension in its extended position in the attachment means 26 of the arched bow 6.

The arched spring support element 6 is attached substantially midway between its roller end attachments 26 by means of a standard clip 34 in removable engagment with the oscillating wiper arm 8. The arched yoke or spring proper 36 of the element 6 is continuous at its opposite distal ends with the expanded attachment means 26; each of which is forked to provide the legs 37 containing the inverted slots 38 having disposed in a facing relation along their interior, opposite and outer terminal ends, the rounded bearing niches or grooves 40 wherein the cable 16 is engaged in a removable snap relationship. The terminal attachment elements 26 are bent inwardly from the substantially longitudinal plane of the spring or yoke 36 to provide clearance for the roller 4 and the washers 24 to thus permit free rotary movement for the roller 4. The cable 16 is thus engaged at its opposite ends in the grooves 40 of the slots 38 with the grommets 30 positioned against the outer border of the end attachment means 26. The margins surrounding the rounded bearing grooves 40 on the outer faces of the legs 37 are countersunk slightly to provide accommodation for the grommets 30 while permitting them a degree of play or lateral movement therein; thus occasioning a slight rocking action as the cable 16 flexes during the oscillating passage of the roller 4 over the windshield 18. That portion of each of the forked legs 37 positioned distally from the clip 34, and beneath the bearing grooves or channels 40 is expanded in this modification of the invention to prevent the cable 16 from dropping out of the slot 38 once it has been snapped into place in the grooves 40. The cable 16 is, of course, capable of ready replacement therein due to the resiliency of the heat treated metal from which the arched member 6 is prepared. The washers 24 are, as indicated above, positioned against the inner margins of the leg 37. The arched spring retainer support means 6 is conveniently prepared from a flat cold rolled or stainless steel strip. It is prepared desirably with the attachments 26 formed integrally therewith or, if desired, with such means machined thereon. The clip 34 may be provided in like manner. Stainless steel spring stock may be employed or in the case of annealed cold rolled steel, it should be heat treated and tempered, illustratively, to a Rockwell harness of 40 on the C scale. The arched devices 6 being made of thin flat metal stock may, of course, be conveniently stamped out completely by a punch press including the end attachment means 26 and the accommodations or clips 34 at the center of the device 6 for the oscillating arm 8. There is thus provided the permanent spring 36 between the opposite attaching ends 26 of which is disposed the roller 4. Spring bow action will of course exist in two areas of the arched member 36; between the extremities 26 as well as between each extremity 26 and the center clip 34; which in the operative state is engaged with the rotary arm member 8. The over-all length of the roller 4, lining 14 and cable 16 is, as indicated above, shorter than the arched spring holder or retainer 6, thus providing for the shallow bow 36. The soft but definite spring action exerted by the bow member 6 is such that it will hold the cylindrical roller 4, or in fact though less desirably, and indeed, undesirably, where a plastic windshield is had, a conventional wiper blade in suspension on a flat, curved, or uneven surface with facility as indicated above.

The spring bow 6 can of course be constructed in any convenient length, though care should be taken where the roller 4 is employed that the roller dimensions, density, and like properties, are such in relation to the pressure exerted by the spring 36 that the bow ends 26 do not scrape the windshields because of sagging along the terminal ends of the roller 4.

The oscillating arm 8 is connected at one end to a hub or axis 42 which is mounted in the casing 44 and connected to the oscillating drive element 46. At its opposite end the arm 8 is attached in a removable but fixed relationship with the spring member 6 by means of the clip 34 in conventional manner as by means of the hook 48. The arm 8 is thus adapted to describe an arcuate path and is further adapted by its disposition on the axis 42 to a fixed impressment toward the windshield 18; thus creating a bias in the spring element 6 when the wiper member is in contact with a windshield surface. The fixed position of the arm 8 relative to movement at a substantially vertical angle to the plane of disposal thereof is thus seen to be a requisite of the present invention; for to have a conventional hinged and spring mounted modification of the arm 8 would destroy the effectiveness of the arched spring member 6. Thus, the pressure exerted against the windshield 18 by a convential wiper blade has normally been effected heretofore by the spring disposed at the junction of the oscillating support arm and hub or axis. The pressure exerted upon the roller 4 is, on the other hand, normally predetermined in the practice of the present invention and designed into the spring bow member 6, illustratively, by predetermination of the thickness, width, and like qualities to be imparted to this latter member at the time of its manufacture. Thus, the arm member 8, the axis 42, positioned at approximately a right angle to said arm 8, and their interconnection as proposed by the present invention represents a significant economy not only in the manufacture of these elements per se but of the total assembly 1, as well. The spring member 6 and the roller 4, both of which are positioned in approximately parallel planes to said arm member 8, are thus adapted by their interconnection with the arm 8 to describe an oscillating path across the windshield surface 18; the roller 4 rotating freely in its arcuate clearing path; and in its oscillating passage, whether the roller 4 is secured in a substantially taut or relaxed manner by the cable 16, reducing rain water, salt spray or the like on the windshield 18 to a flat transparent film through which clear vision is maintained. The roller element 4 is, as indicated above, particularly valuable in its application to transparent plastic, i.e. Plexiglas, windshields such as those so frequently employed in small water borne cruisers, motor boats and the like.

The oscillating drive means 46 is shown as a handle in FIGURE 1 adapted for manual control about the axis 42. This latter member is mounted, as noted above, in the casing 44 and adapted to free rotation therein. A motor or other suitable drive means may also be employed if desired to energize the axis 42 and effect rotation of the wiper arm 8, spring element 6 and roller 4, if desired.

The casing 44 is, as seen in FIGURE 1, a part of the means 12 for engaging the windshield wiper assembly 1 in operative relationship with the windshield 18. The clamping means 12 for adapting the assembly 1 for wiping of the windshield 18 of a vehicle is positioned as seen in the accompanying drawings, FIGURES 1 and 4, at the top of the windshield 18. This is the most feasible mode of application normally for employment of the hand operated windshield wiper of the invention in a small boat or the like. Typically, in such instances, the windshield 18 is clear plastic without trim, metallic or otherwise, about the upper border 50 thereof or with a finished metallic trim 52 made of either aluminum or stainless steel along the entire top margin 50. In either event, the vehicle clamp and hub casing member 12 composed of the casing 44 machined or cast as a single entity, and mounted on the clamping element 54 at right angles thereto, is positioned atop the windshield 18 by means of the clamp or bracket 54. With suitably disposed and spaced orifices, receiving a corresponding number of set screws 56 in one of the downwardly disposed flanges 57 thereof, the clamping element 54 is positioned above and about the upper untrimmed edge 50 or the metallic trim 52 of the windshield 18 and a shim 58 substantially of the same length as the bracket or channel 54 positioned between the trim 52 or untrimmed margin 50, and the set screw (56) bearing flange 57 of the clamp 54; the shim 58 thus serving to protect the windshield surface or trim from damage induced by the set screws 56. The vehicle engaging means 12 is normally made of a non-corrosive metal such as bronze or brass where marine use is contemplated.

Where, as often occurs, narrow or reduced trim 52a is present on the upper windshield margin 50, a metal shim 58a may be supplied as seen in FIGURE 4 which is partially folded or which simply has an expanded lower portion along its length to complement and compensate for the upper narrow margin of downwardly directed trim 52a (see FIGURE 4); thus affording the assembly 1 a stable engagement with the windshield 18.

Figure 5:
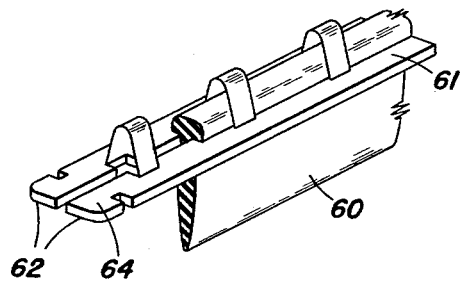
FIG. 5 is a fragmentary perspective view of a wiper blade for use in a modification of the invention.
Figure 6:
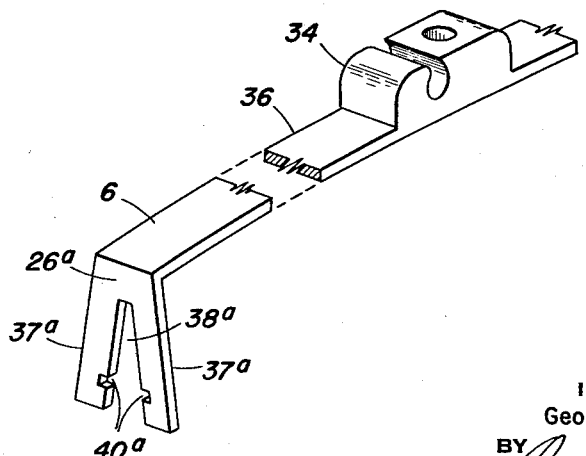
FIGURE 6 is a fragmentary elevational view of a modified wiper support element for use with the wiper blade of FIGURE 5.

It is noted that the arm 8 and bow spring member 6 of this invention are adaptable for use with a conventional wiper blade, such as that shown in FIGURE 5 and designated by the numeral 60. In this modification the expanded end portions 26a, defining the forked legs 37a of the arched spring member 6, as seen in FIGURE 6, again contain slots 38a defining an inverted V. The lateral borders of these slots 38a, rather than having the rounded grooves 40, may now present the opposed fine notches 40a, adapted to receive the flanges 62 of the channeled housing 61 of the conventional wiper blade 60. It will be evident that the terminal ends 64 of the wiper blade 60 will be held by the arched spring retaining support 6 with sufficient tension to form a slight bow itself and still remain sufficiently pliant and resilient to follow the curve in auto windshields in its scraping or wiping action. As in the case of the roller 4, the conventional wiper blade 60 is easily removed from the arched retainer member 6, since the forked legs 37a of the spring engagement ends 26a hold the flanges 62 of the blade 60 only by spring tension which is, however, more than adequate for proper retention thereof during operation of the wiper assembly 1. This forked terminal construction can, in fact, be seen to provide a desirable rocking action of the flanges 62 while the blade 60 is proceeding in its oscillating clearing arc.

What is claimed is:

1. A windshield wiper assembly that comprises a resilient flexible roller; a flexible shaft passing through the length of said roller; said roller being adapted thereby to free rotation about said shaft; an arched spring support member; the terminal ends of said support member being adapted to receive the terminal ends of said flexible shaft; an oscillating arm, one end of which is connected to said arched spring support member at a point between the opposite ends thereof; the opposed end of said arm being connected to the outer terminus of an axis about which said arm is adapted to oscillate in a prescribed arc exerting simultaneously a fixed, inflexible impressment toward said arched spring element and roller; thus inducing a spring bias in said arched spring member when the roller is in contact with a windshield surface; said axis being connected at its inner terminus to means for effecting the oscillation of said arm; and means disposed about said axis for mounting said assembly on a vehicle.

2. A windshield wiper assembly that comprises an elongate, soft, flexible cylindrical tubular roller; a harder flexible smooth liner disposed along the interior of said tubular roller; a flexible cable passing through the length of said liner; said roller being adapted thereby to free rotation about said cable across the surface of a windshield and to flexion when said surface is uneven; an arched spring support member; the terminal ends of said cable being disposed in detachable slotted engagement with the terminal ends of said arched spring support member; an elongated arm adapted to oscillate about an axis; the end of said arm remote from said axis being connected to the arched spring support member at a point between the opposite ends thereof; an axis as aforesaid; said axis being connected at its outer end to the base of said arm and at its inner end to an actuating drive means; said latter means being adapted to effect the rotation of said axis, said arm, the arched spring support member and roller about an arcuate path; said axis being connected to the base of said arm in such a manner as to exert a fixed impressment of said arm toward said arched support member and roller to cause a spring bias in said arched support member when said roller is in contact with a windshield surface.

3. A wiper assembly for use on a plastic windshield that comprises an elongate, soft, flexible cylindrical tubular roller; a harder, flexible smooth liner disposed along the interior of said tubular roller; a flexible cable passing through the length of said liner; said roller being adapted thereby to free rotation about said cable across the surface of a windshield and to flexion when said surface is uneven; an arched spring support member; the terminal ends of said cable being disposed in detachable slotted engagement with the terminal ends of said arched spring support member; an elongated arm adapted to oscillate about an axis; the end of said arm remote from said axis being connected to the arched spring support member at a point substantially midway between the opposite ends thereof; an axis as aforesaid; said axis being connected at its outer end to the base of said arm and at its inner end to an actuating drive means; said latter means being adapted to effect the rotation of said axis, said arm, the arched spring support member and roller about an arcuate path; said axis being connected to the base of said arm in such a manner as to exert a fixed impressment of said arm toward said arched spring member and roller to cause a spring bias in said arched support member when said roller is in contact with a windshield surface; a casing mounted about said axis; said axis being adapted for free rotation therein; said casing being integrally connected to a clamping means for removably attaching said wiper assembly to the top of a plastic windshield.

4. The assembly as claimed in claim 3, wherein a shim of modified conformation is adapted for positioning within said clamping means to adapt the engagement of said clamping means to windshield margins of modified conformation; said shim complementing said margin conformation to provide an adequate clamping surface for said clamping means.

5. The assembly claimed in claim 3, wherein the cylindrical roller has a smooth outer surface.

6. The assembly claimed in claim 3, wherein the cylindrical roller has a fluted outer surface.

References Cited in the file of this patent

UNITED STATES PATENTS

| | | |
|---|---|---|
| 1,594,954 | Hesse | Aug. 3, 1926 |
| 2,593,073 | Trevaskis | Apr. 15, 1952 |
| 2,659,097 | Morton | Nov. 17, 1953 |
| 2,689,369 | Biek | Sept. 21, 1954 |

FOREIGN PATENTS

| | | |
|---|---|---|
| 760,378 | Great Britain | Oct. 31, 1956 |